United States Patent [19]
Bush

[11] 3,855,003
[45] Dec. 17, 1974

[54] THERMAL SENSING, FIRE SAFING DEVICE FOR A THERMAL BATTERY

[75] Inventor: Donald M. Bush, Tijeras, N. Mex.

[73] Assignee: The United States of America as represented by the United States Atomic Energy Commission, Washington, D.C.

[22] Filed: Jan. 2, 1974

[21] Appl. No.: 430,313

[52] U.S. Cl. .............................. 136/83 T, 136/182
[51] Int. Cl. ......................................... H01m 21/14
[58] Field of Search ........ 136/83 T, 83 R, 182, 181, 136/161, 112, 90; 337/416

[56] References Cited
UNITED STATES PATENTS

| | | |
|---|---|---|
| 2,888,538 | 5/1959 | Jensen ............................ 337/416 X |
| 3,309,481 | 3/1967 | Merrill ............................ 337/416 X |
| 3,677,822 | 7/1972 | Bush ................................. 136/83 T |
| 3,719,527 | 3/1973 | Carlsten et al. .................. 136/83 T |

*Primary Examiner*—Anthony Skapars
*Attorney, Agent, or Firm*—John A. Horan; Dudley W. King; Ignacio Resendez

[57] ABSTRACT

A thermal cell or battery including heat sensing means to short circuit electrical output terminals when the cell is exposed to excessive external heat to thus prevent undesired electrical output of the cell or battery.

10 Claims, 7 Drawing Figures

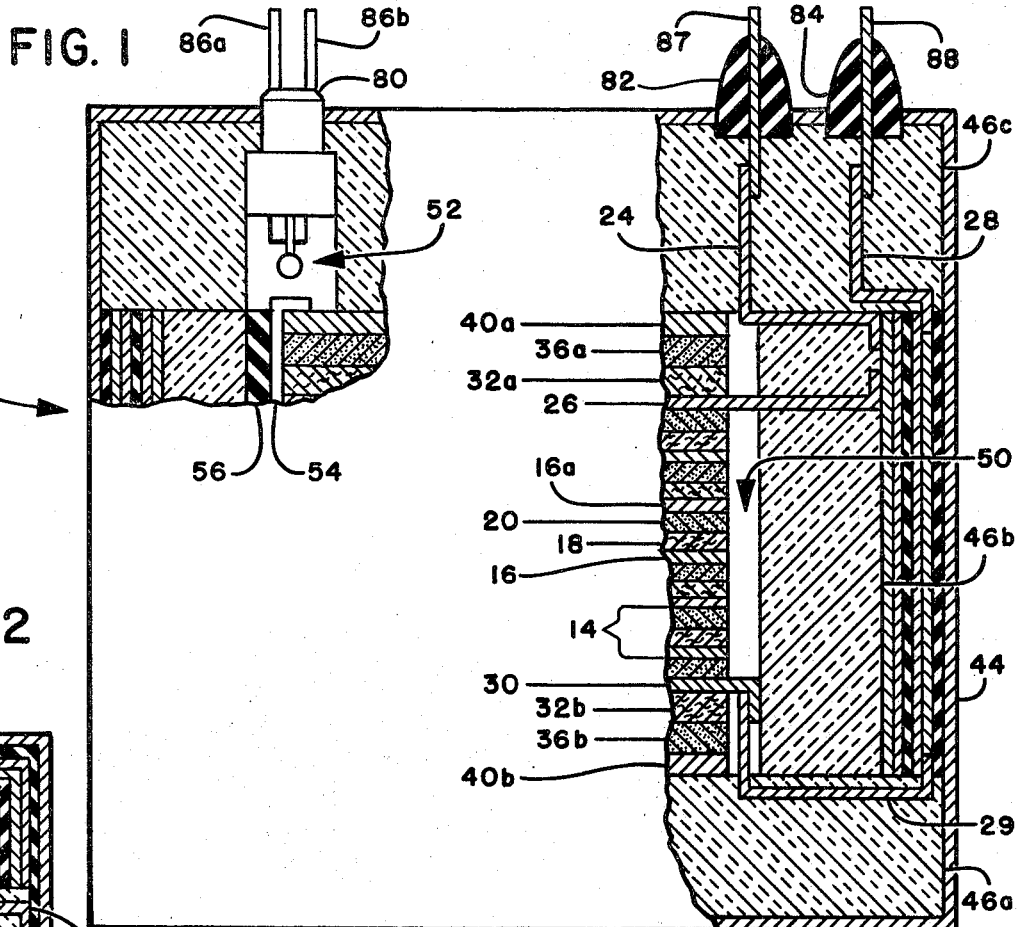
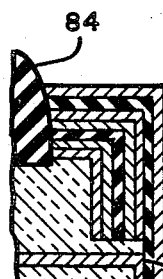
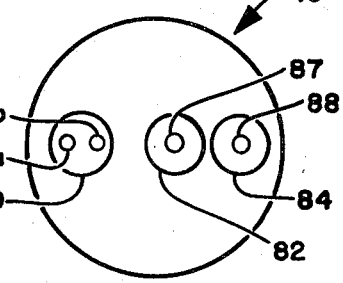
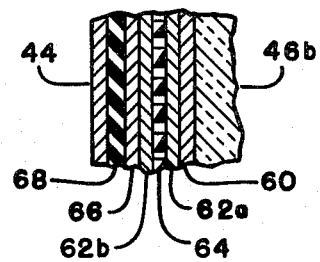
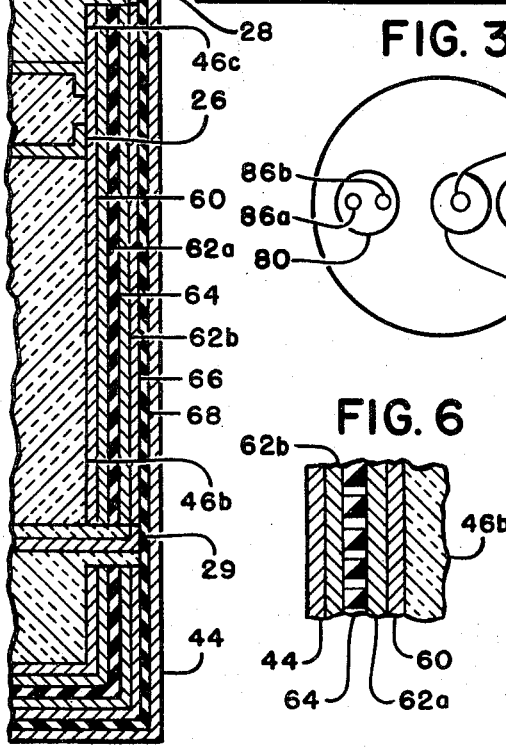
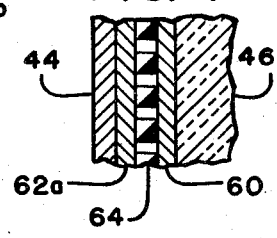
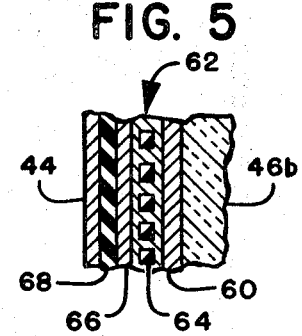

THERMAL SENSING, FIRE SAFING DEVICE FOR A THERMAL BATTERY

BACKGROUND OF INVENTION

The invention relates to thermal cells or batteries and means for short circuiting the output terminals when the cell or battery is exposed to an external heat environment.

Thermal cells or batteries are generally known and may be of the type described in U.S. Pat. No. 3,677,822, which issued on July 18, 1972 to the present inventor. Thermal batteries, which may comprise one thermal cell or a plurality of thermal cells to form a thermal battery, are generally used as power sources in applications where reserve batteries having long shelf life are required. These batteries generally employ electrochemical cells which are activated by internal heat sources upon appropriate command. If such prior art batteries are exposed to an undesired or uncontrolled external heat source, such as a fire environment, the heat may be sufficient to melt the electrolyte and result in unwanted activation and electrical output of the thermal battery.

It is desired to provide a means for preventing unwanted electrical output as a result of an unexpected or undesired heat environment. The type of protection provided should be such as to sense thermal energy entering the battery from the exterior and from any direction or from a specific direction, should preferably be of minimal weight and thickness especially for space applications where mass is critical, and should not short circuit the battery or otherwise inactivate the battery during useful battery electrical output operation when the internal heat source is activated for the proper operation of a system in which the thermal battery is located.

SUMMARY OF INVENTION

In view of the above, it is an object of this invention to provide a means for short circuiting the battery terminals, or so electrically interconnecting the battery internally upon exposure to an unexpected or undesired external fire or heat environment as to obviate normal electrical output.

It is further object of this invention to provide a means of minimal weight and thickness for protecting a thermal battery from unwanted electrical output from an external heat environment.

It is a further object of this invention to provide a means for protecting a thermal battery from an external heat environment to prevent unwanted electrical output without adversely affecting or being affected by normal thermal battery operation.

Various other objects and advantages will appear from the following description of the invention and the most novel features will be particularly pointed out hereinafter in connection with the appended claims. It will be understood that various changes in the details and materials as are herein described and illustrated in order to explain the nature of the invention may be made by those skilled in the art without departing from the scope of this invention.

The invention comprises a thermal battery having thermal sensing means which, upon application of heat from a source external to the thermal battery, act to short circuit the battery terminals and prevent thermal battery electrical output while not hindering or affecting, in normal operation of the system, battery activation at an appropriate signal or command.

DESCRIPTION OF DRAWING

FIG. 1 is a partial cutaway view and partial cross section of a typical embodiment of a thermal battery using this invention.

FIG. 2 illustrates an alternate embodiment of this invention.

FIG. 3 is the top view of the battery of FIG. 1.

FIG. 4 is an enlarged view of a portion of the thermal sensing means as illustrated in FIG. 1.

FIG. 5 is the representation of FIG. 4 after activation of the thermal sensing means by an external heat source.

FIGS. 6 and 7 are views of alternate embodiments of this invention.

DETAILED DESCRIPTION

The fire safe thermal battery 10 shown in FIG. 1 may comprise a plurality of electrochemical cells 14 assembled in a stack or the like on an insulating mandrel (not shown) or by any other suitable means known in the art. The electrochemical cells 14 may contain an anode or negative electrode 16 separated from the next cell anode 16a by an electrolyte pellet 18 and a heat generating pellet 20. A typical thermal battery and electrochemical cell composition and arrangement is described in U.S. Pat. No. 3,677,822 referred to hereinabove.

A suitable cathode lead 24 may be appropriately electrically connected by means of a conductive layer as will be described hereinafter with a positive terminal disc 26. An anode terminal lead 28 may also be appropriately electrically connected by means of a conductive material and a conductive lead 29, as will be described hereinafter, with a negative terminal disc 30. Adjacent the positive and the negative terminal discs on sides opposite the stack may be disposed buffer or thermal reservoir pellets 32a, 32b in contact with heat generating pellets 36a, 36b. The stack may be retained in position through such as end plates 40a, 40b held in compression with the stack and other herein referred to pellets therebetween by means of an insulative mandrel and suitable locking means such as a nut and bolt (not shown). Positive terminal disc 26 and negative terminal disc 30 may otherwise be referred to as the output electrodes to which electrical connection is made to use the battery power. Thermal battery 10 may have a housing 44 which may be such as a conventional "tin" can and cover adapted for this application, or may otherwise be suitably formed from cold-rolled steel or other suitable materials such as metals or plastics. Disposed between the housing 44 walls and the electrochemical cell stack are appropriate insulators 46a, 46b and 46c, which effectively retard heat loss after activation of the thermal battery. These insulators also act to prevent, impede or minimize heat input from a source external to the stack and thereby inhibit or retard, together with the thermal sensing means herein described, accidental activation of the battery with electrical output. Insulator material and thickness may be selected such that proper activation of the thermal cell or battery will not activate the heat sensing means during the useful or operational life of the battery. The insulators may be made of any suitable material and preferably are of a semi-rigid insulation which may be machined and may sustain compressive stresses or forces during manufacture and use of the thermal battery. The insulation material may be a mixture of submicroscopic pyrogenic silica, quartz fibers and titanium dioxide opacifier with a composition ratio of about 75-9-16 percent for the respective materials as described in the above-cited patent. Such formulation may be mixed and pressed to a nominal density of about 20 pounds per cubic foot with a thermal conductivity of about 0.2 Btu-in./hr.-ft$^2$-°F at a mean temperature of 260°C. Any other appropriate insulating material having the required compressive strength, low thermal conductivity and the like may also be used.

A gap 50 may be provided intermediate the insulative member 46b and the stack of electrochemical cells at the periphery of the battery cell stack elements to allow a space about the cell stack in which beads of conductive materials may be formed during operation as is known in the art. Thermal battery 10 may be appropriately activated by means of an electrical match 52 or the like which ignites fuze strip 54 adjacent and intermediate the stack of electrochemical cells and insulative layer 56.

The thermal safing device or means which enables short circuiting of the battery terminals may comprise or include a laminated or the like structure, as shown in FIG. 1, and a portion of which is illustrated in an enlarged view in FIG. 4, disposed intermediate all exterior sides of, or selected exterior portions of, insulative material such as insulators 46a, 46b and 46c and thermal battery housing 44 walls to prevent premature activation of the thermal battery from heat inwardly directed from external sources at any or selected directions. The thermal safing device may comprise an electrically conductive member 60 such as a layer, film or the like upon which may be superimposed or otherwise disposed in electrical contact a low melting material which may be in various forms such as a coating, layer or deposit 62a of tin (melting point 232°C), lead (melting point 327°C) or other low melting element, or a low melting alloy, such as an alloy of tin and lead at the eutectic composition 37 percent lead and 63 percent tin (melting point 183°C) or other metals or alloys having the desired melting point temperature. Low melting temperature layer 62a may be disposed on conductive member or layer 60 on the side opposite the insulative material 46. The low melting material may be placed on layer 60 by means of electrodeposition, vacuum deposition, or the like to a thickness of from about 0.003 inch to about 0.010 inch. These dimensions and others recited herein are not restrictive as long as sufficient material is provided to fill the pores or effect electrical contact as will be hereinafter described.

The low melting material or alloy may be likewise placed upon conductive layer 60 as a sheet or other layer, such as in a bimetallic material strip or wall, at like thicknesses. The bimetallic strip refers to such as two component metal strips —e.g.— tin and iron, nickel and tin, or the like. The low melting temperature layers or coatings herein used should be selected to have a melting point below that of the electrolyte pellets 18 and above any ambient temperature to which the battery may be exposed during normal use. The terms "short-circuit" and "short-circuiting" or "shorting" are used in their ordinary sense in electrical terminology —i.e.— an electrical circuit is considered to be shorted when an electrical connection is made between the terminals, or leads extending therefrom, such that there is no resistance between them and hence, voltage may not exist between them.

Placed or superimposed on the low melting temperature layer 62a may be a perforated nonconductive material 64 or separator material 64 such as perforated mica or glass cloth having openings or apertures sufficiently large to allow flow and penetration through the openings of the low melting material used, and sufficiently small to prevent unwanted contact between the low melting point layers 62a, 62b across the perforations of layer 64. A preferred size may be about ⅛ inch diameter openings. The perforate material may be of any thickness which permits flow of the molten tin or other low melting point material to achieve electrical conductivity and yet retains the layers on opposite sides of the perforate material separated. A suitable thickness of perforate layer 64 may be from about 0.003 inch to about 0.010 inch or greater. The separator material 64 may otherwise comprise an air gap used for the same purpose.

Disposed, placed or superposed on the perforate insulative material 64 on a side opposite the low melting temperature layer 62a may be another layer or other form of low melting temperature material 62b as hereinabove described. This may be the same material as 62a or different, as desired. Disposed or placed in electrical contact with this material 62b may be a conductive member or material 66, such as iron in the form of a sheet or the like, at any suitable thickness such as from about 0.003 to about 0.010 inches or greater.

The low melting temperature layers 62a, 62b may have disposed intermediate thereof, as described hereinabove, a separator or other perforate electrically insulative material 64. Low melting temperature material 62a, 62 b will melt upon application of sufficient thermal energy from a source external to the thermal battery prior to activation of the electrochemical cells within the thermal battery, and the molten material will flow through the perforations and effect a thermal battery electrical output short circuit, since, as shown in FIG. 1, the inner conductive layer 60 is electrically connected to the cell stack terminal cathode disc 26 and to terminal 87 passing through feed through connector 82 by means of lead 24, and the outer conductive layer 66 is electrically connected by means of lead 29 to the cell stack terminal anode disc 30 and by means of lead 28 to the other battery terminal 88.

FIG. 5 illustrates molten layers 62a, 62b having penetrated the pores in the perforate material to effect the electrical contact between the conductive layer 60 and electrically conductive layer 66 thus short circuiting the electrical output of the battery. Molten layer 62 generally encompasses or envelopes perforate material 64.

Any appropriate electrically insulative material 68, such as mica, may be placed, disposed or otherwise superposed over the conductive layer 66 to provide electrical insulation between the conductive layer 66 and an outer container housing 44.

FIG. 1 illustrates one embodiment which may be preferred. In this embodiment, the thermal sensing means is disposed as cylindrical layers generally encircling or surrounding a central portion of the thermal battery and preferably about the thermal battery stack as illustrated. As illustrated, outer housing 44 is preferably a heat conductive material which, regardless of the direction or source of external heat, conveys heat to the thermal sensing means and activates same to short circuit the battery terminals and prevent electrical output from the thermal battery. FIG. 2 illustrates an alternate embodiment wherein the thermal sensing means is shown generally surrounding all of the thermal battery including insulators 46a, 46b and 46c.

FIG. 3, which is a top view of the fire safe thermal battery 10, illustrates typical positions of appropriate feedthrough connectors 80, 82, 84 for passage of corresponding electrical leads 86a, 86b, cathode terminal 87, and anode terminal 88 through the housing. As is known in the art, the feedthrough connectors used provide a hermetic seal.

Although thin, concentric, cylindrical layers are illustrated in the thermal battery embodiment of FIG. 1, it may be desirable to protect only a portion of the thermal battery, such as the bottom portion, and as such a similar arrangement of layers would be disposed only on the portion desired to be protected. As such, it may be seen that various designs and arrangements may be made using this invention without departing from the scope of this invention. This thermal safing device, or fire safe means, for thermal batteries provides compact, simple and light design into conventional thermal batteries and protects them from activation in a fire environment. The layers which comprise the fire safe or thermal safing device may preferably be about 5 mil thickness each to provide the compact, simple and light design described above.

It may be desired to use the configuration shown in FIGS. 6 and 7 wherein the outer layer or housing 44 is used to replace conductive layer 66 and insulative layer 68. Housing 44 is still the container for the entire thermal assembly 10 and is of a thickness of from about 0.010 to about 0.060 inch or greater. This would eliminate the need for conductive layer 66 and insulation 68. Use of this embodiment would be feasible when the outer container 44 may be electrically common with either the positive or negative output of the battery. It should be noted, as shown in FIG. 7, that one of the low temperature melting materials 62a may be sufficient for the thermal safing means, relying on material flow to pass through the pores and make electrical contact with the conductive layer on the opposite side of perforate layer 64.

In embodiments of FIGS. 4, 5, 6, and 7, external heat application results in the flow of low melting temperature material to effect electrical short circuiting between the positive and negative terminals or terminal cathode 26 and terminal anode 30.

The inventor has used various embodiments, such as shown in FIG. 1, to protect thermal batteries. For example, fire safe thermal batteries having one stack (28 volts) of 2 inch diameter cells in a 2½ inch diameter case were exposed to simulated fire environments. One unit was heated to greater than 900°C and the fire safe device properly functioned at which time heat was removed before electrochemical cell activation. Another unit was heated until the thermal cells were activated after the thermal sensing/fire safing device functioned. In both instances, there was no output recorded from the battery, both thermal safing devices did activate and short circuit the battery terminals, and, in the second instance, even though the thermal cells were activated, there was no electrical output registered since there was a short circuit across the battery electrical output circuit.

The above tests demonstrate that the thermal sensing means of this invention will function from an external heat source before the battery activates and will short circuit or short out the battery terminals to prevent or impede output.

As shown in FIG. 1 and described herein, a preferred embodiment may have the battery output terminals in series with the thermal sensing/safing device preventing power from reaching the external load in which the battery circuit is disposed in the event that an internal lead opened due to a high shorting current. This invention description is not intended to preclude other electrical arrangements. For example, in one embodiment, terminal discs or terminal electrodes 26, 30 may extend to an outer portion of thermal battery casing or housing to become battery terminals and as such the reference to thermal cell electrodes and battery terminals may be synonymous. Thus a reference to "shorting the terminals" or "shorting portions of the terminals" may be understood to encompass "shorting of the electrodes."

From the above, it may be seen that a thermal safing device may be built into a thermal battery to provide a fire safe thermal battery. Although reference has been made herein to a thermal battery having a plurality of electrochemical or thermal cells, it is obvious that the invention is applicable to a one thermal cell thermal battery, and battery as used herein includes the situation wherein the "battery" has only one thermal cell. Thus, in a fire or other external heat environment, unwanted electrical output of the thermal battery is prevented. The thermal sensing device or fire safing means is compact, simple and relatively light and may thus be used for space and other applications. Although reference has been made herein to one specific terminal being an anode or a cathode, it is quite obvious that either one could be a cathode or anode or that these terminals could enter a battery housing through various points.

What is claimed is:

1. In a thermal battery comprising a casing; a plurality of electrical battery cells within said casing, thermal insulation positioned about said battery cells between said battery cells and said casing and a pair of terminals normally electrically isolated from each other, the improvement in combination therewith comprising a heat sensing means for preventing thermal battery electrical output in response to application of external heat, said heat sensing means comprising short circuiting means having low melting temperature material disposed between said thermal insulation and said casing for melting and electrically interconnecting portions of said terminals upon application of sufficient heat from exterior of said thermal battery.

2. The combination of claim 1 wherein said terminals include output electrodes within said thermal battery.

3. The combination of claim 1 together with a first member in electrical contact with said low melting temperature material and with one of said terminals, a second member in electrical contact with the other of said terminals, and permeable means for electrically insulating, during normal operating conditions, said low melting temperature material from said second member and for effecting said electrical short circuiting through said molten material contact of said first and said second members.

4. The combination of claim 3 wherein said low melting temperature material is a layer of from about 0.003 to about 0.010 inch thickness and said first and second members are layers of from about 0.003 to about 0.010 inch thickness.

5. The combination of claim 3 further including low melting temperature material in electrical contact with said second member for melting and electrically interconnecting with said low melting temperature material in electrical contact with said first member.

6. The combination of claim 3 wherein said permeable means is taken from the group consisting of perforate mica, and glass cloth.

7. The combination of claim 3 wherein one of said members comprises an outer casing for said thermal battery.

8. The combination of claim 1 wherein said low melting temperature material is selected from the group consisting of lead, tin, and mixtures thereof.

9. The combination of claim 1 together with thermal insulation against heat generated during thermal cell operation in said thermal battery disposed intermediate said thermal cell and said low melting temperature layer.

10. The combination of claim 3 wherein one of said terminals, said first member in electrical contact with said low melting temperature material and an output electrode of said thermal battery are electrically connected in series and wherein the other of said terminals, said second member, and the other output electrode of said thermal battery are also electrically connected in series.

* * * * *